United States Patent [19]
Peddle et al.

[11] 3,991,307
[45] Nov. 9, 1976

[54] INTEGRATED CIRCUIT MICROPROCESSOR WITH PARALLEL BINARY ADDER HAVING ON-THE-FLY CORRECTION TO PROVIDE DECIMAL RESULTS

[75] Inventors: Charles Ingerham Peddle, Audubon; Wilbur L. Mathys, Spring City; William D. Mensch, Jr., Norristown; Rodney H. Orgill, Hatfield, all of Pa.

[73] Assignee: MOS Technology, Inc., Norristown, Pa.

[22] Filed: Sept. 16, 1975

[21] Appl. No.: 613,890

[52] U.S. Cl. ................................ 235/173; 235/174
[51] Int. Cl.² .......................................... G06F 7/385
[58] Field of Search ........................... 235/173–174

[56] References Cited
UNITED STATES PATENTS 3,265,876   8/1966   Lethin.................................. 235/173

Primary Examiner—R. Stephen Dildine, Jr.

[57] ABSTRACT

Disclosed is an integrated circuit microprocessor with a parallel binary adder whose output can be corrected on-the-fly to provide decimal results. The correction is by logical gating which operates selectively and on-the-fly, that is, while the sum from the output of the binary adder is being transferred to an accumulator. As a result, the same binary adder can provide the binary sum of the operands supplied to it, or the binary coded decimal sum of bcd operands, or the binary coded decimal difference of bcd operands, in a single operating cycle and without the need to recycle the sum of the operands through the adder. This single cycle correction significantly speeds up the operation of the invented microprocessor as compared to known prior art microprocessors which recycle the adder output when a binary coded decimal sum or difference is required.

8 Claims, 4 Drawing Figures

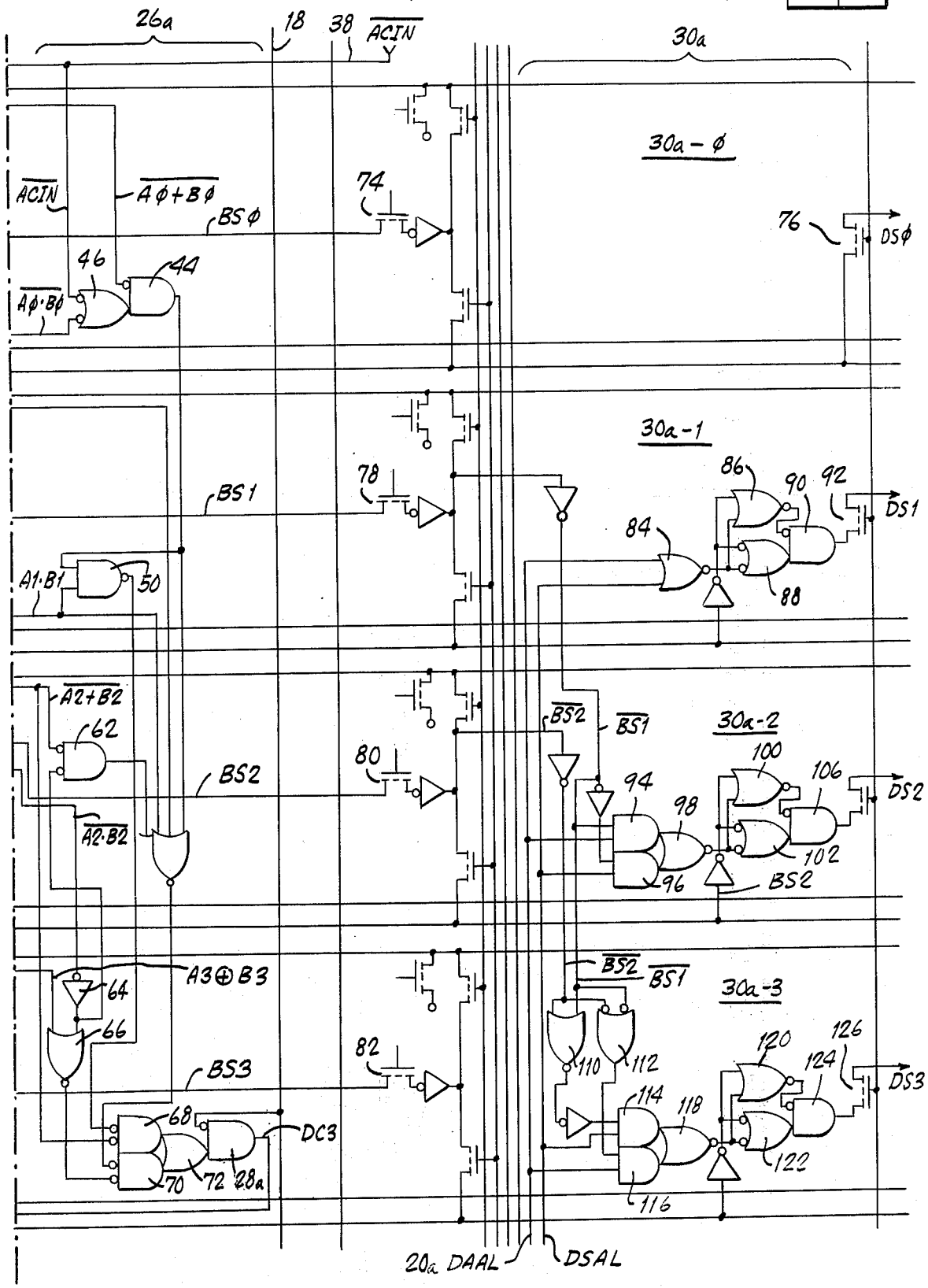

INTEGRATED CIRCUIT MICROPROCESSOR WITH PARALLEL BINARY ADDER HAVING ON-THE-FLY CORRECTION TO PROVIDE DECIMAL RESULTS

BACKGROUND AND SUMMARY OF THE INVENTION

The invention relates to microprocessors and similar machines and specifically to an improvement in the arithmetic units of such machines.

It is known in microprocessors to add bcd (binary coded decimal) operands in a parallel, straight binary adder and to then correct the sum so as to obtain a result which is in binary coded decimal form. Specifically, it is known that when the binary number 0110, which is the decimal number 6, is added to a 4-bit binary number the result is the binary coded decimal equivalent of that 4-bit binary number (plus a possible decimal carry). Based on this operation, it is possible for a microprocessor to have only a binary adder and to use the same straight binary adder to provide a binary coded decimal sum of the operands supplied to it by adding 0110 to each 4 bits of the sum from the adder (while accommodating carries). For example, a binary coded decimal sum is obtained in the prior art by adding two bcd operands in a parallel binary adder and then recycling the sum through the same binary adder as one operand while using 0110 as the other operand for each 4 bits (and taking carries into account). It is also known that the binary coded decimal difference of two bcd operands can be obtained by adding 1010, which is the decimal number 10, to the sum of the operands (and keeping track of carries). In a prior art example, this is again done by adding the two operands in a binary adder and recycling the resulting sum through the adder as one operand of a straight binary addition operation whose other operand is 1010 for each 4 bits.

It takes two cycles of the binary adder in each of these prior art operations to get the binary coded decimal sum or difference of two bcd operands: one cycle to get the binary sum and another to add a fixed binary number to the binary sum so as to get the binary coded decimal sum or difference of the original operands.

It is desirable in microprocessors to improve the speed by reducing the number of cycles necessary to perform a given operation. However, it is also desirable to have a minimum number of components, and it is typically not justified to have both a binary and a decimal adder in the same microprocessor. The prior art has typically chosen the disadvantage of using two cycles to get a decimal sum or difference rather than to suffer the cost of a separate decimal adder.

This invention takes a new approach to the problem: it uses only a binary adder to get the decimal sum or difference of two numbers, but does it in a single cycle of the binary adder, thus significantly improving the speed of operation without suffering the cost of an additional decimal adder. In accordance with the invention, the binary sum of two bcd operands is corrected by suitable gating as it travels from the binary adder to another part of the microprocessors, e.g., the accumulator, so that it becomes the binary coded decimal sum or difference of the two operands by the time it reaches that other part of the microprocessor.

More specifically, the invention is implemented in a machine, such as a microprocessor, which has a source of two binary or bcd operands, such as two registers, a binary adder, a source of a command for selectively performing decimal addition or decimal subtraction of the operands, and a destination for the binary or decimal sum or difference of the operands, such as an accumulator. In response to a command for decimal addition or decimal subtraction of the operands, suitable gating is activated to change certain adder carry bits from binary to decimal carries, and the output of the binary adder is modified by other gates to change selected bits of the binary sum such that the number delivered to the accumulator is the decimal sum or difference of the operands rather than the straight binary sum thereof.

In one specific embodiment of the invention, two 8-bit operands are applied to a parallel 8-bit binary adder. The binary carry from the low 4-bit section of the adder is changed by suitable gating to become a decimal carry, while the sum provided by the adder is corrected by other suitable gates as it travels toward the accumulator to change it to the binary coded sum or difference of the operands. The binary carry from the high order 4-bits of the binary adder is corrected to become a decimal carry which may be supplied to other portions of the microprocessor. The low 4-bits section of the binary adder can receive a carry-in from other parts of the microprocessor.

BRIEF DESCRIPTION OF THE DRAWINGS

FIGS. 2a and 2b, which fit together as illustrated in FIG. 2, form a partly block and partly circuit diagram showing the same embodiment of the invention in greater detail.

DETAILED DESCRIPTION

Figure 1:
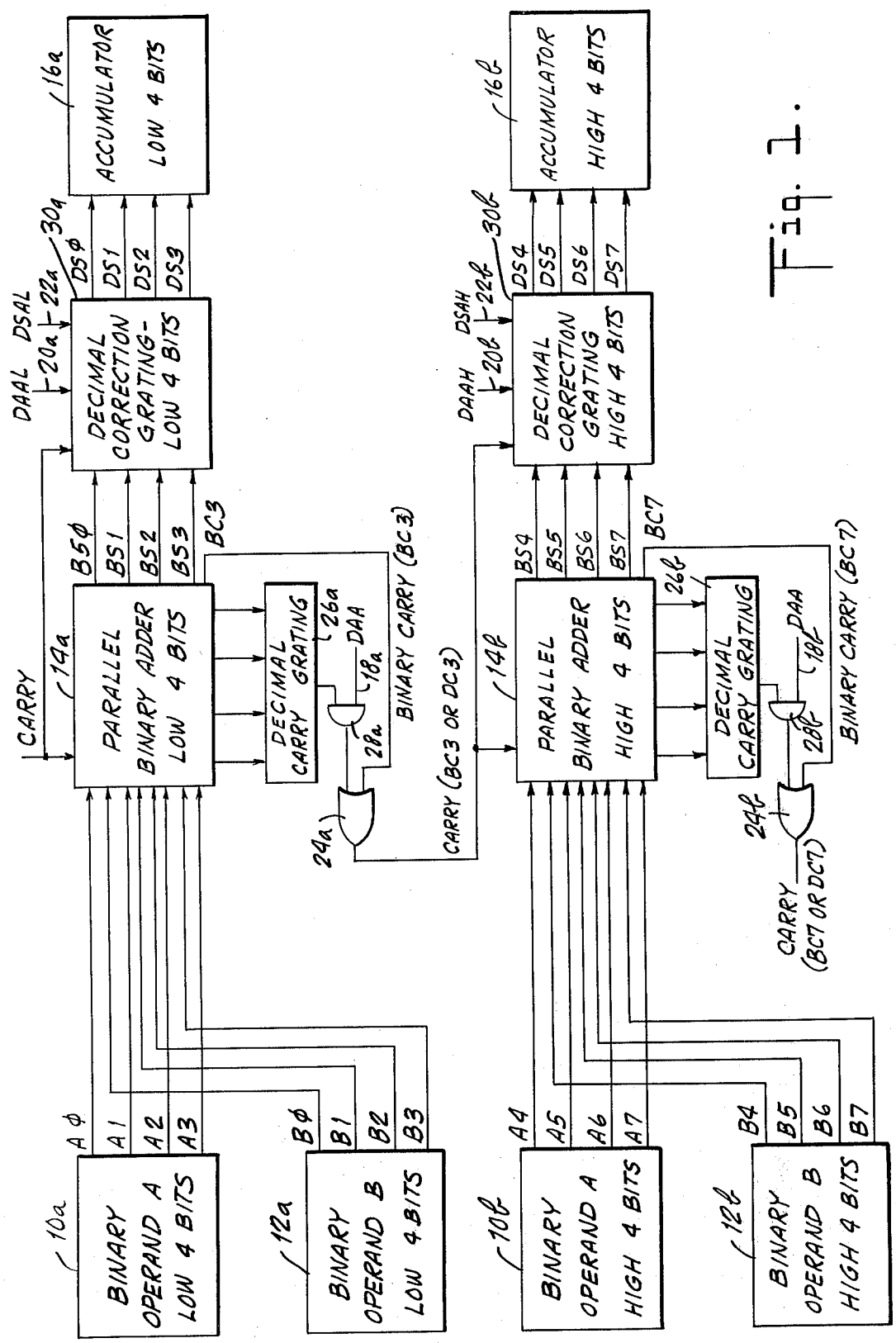
FIG. 1 is a block diagram illustrating an embodiment of the invention.

Referring to FIG. 1 the portion of the microprocessor which is relevant to this invention comprises: sources 10a and 10b for the low 4 bits A0 to A3 and the high 4 bits A3 to A7, respectively, of an operand A; sources 12a and 12b for the low and high 4 bits B0 to B3 to B7 respectively, of an operand B; 4-bit parallel binary adders 14a and 14b for the low 4 bits and high 4 bits, respectively, of the operands A and B; and accumulators 16a and 16b for the low 4 bits and high 4 bits, respectively, of the operation result. When a decimal operation is to be performed, a command signal DAA is present at lines 18a and 18b, and either the command signals DAAL and DAAH are present at lines 20a and 20b to force a decimal addition operation, or the command signals DSAL and DSAH are present at lines 22a and 22b to force a decimal subtraction operation.

When only a binary operation is to be performed, the operands A and B are in straight binary code, none of the decimal command signals is present, the binary carry BC3 from the low 4-bit section 14a of the binary adder is applied through an OR-gate 24a to the high 4 bits section 14b of the adder, and similarly the binary carry BC7 from the high 4-bits section 14b of the binary adder is provided at the output of an OR-gate 24b. A decimal carry DC3 is generated from the low 4-bit section 14a of the binary adder by a decimal carrying gating 26a, but it is prevented from being applied to the section 14b because an AND-gate 28a is closed at this time by the absence of the decimal operation command DAA at line 18a. A similar decimal carry gating network 26b and a similar AND-gate 28b are associated with the high 4-bit section 14b of the binary adder. Moreover, when only a binary operation is to be carried out, the decimal command signals DAAL(H) and DSAL(H) are not present, and the binary sum bits BS0 to BS3 and BS4 to BS7 from the adder sections 14a and 14b, respectively, pass unmodified through decimal correction gating circuits 30a and 30b, respectively, to reach the accumulator sections 16a and 16b, respectively.

When a decimal operation is to be performed, the operands A and B are in binary coded decimal form, the command signal DAA is present at lines 18a and 18b respectively, and either (a) the command signals DAAL and DAAH are present at lines 20a and 20b, respectively, or (b) the command signals DSAL and DSAH are present at lines 22a and 22b, respectively. As a result, a decimal carry DC3 is supplied from the adder section 14a to the adder section 14b, and the decimal correction gating circuits 30a and 30b are activated to modify the binary sum bits BS0 to BS3 and BS4 to BS7, respectively, so as to supply to the accumulators 16a and 16b the decimal result bits DS0 to DS3 and DS4 to DS7, which are either the bcd sum or the bcd difference of the rod operands A and B.

Figure 2A:
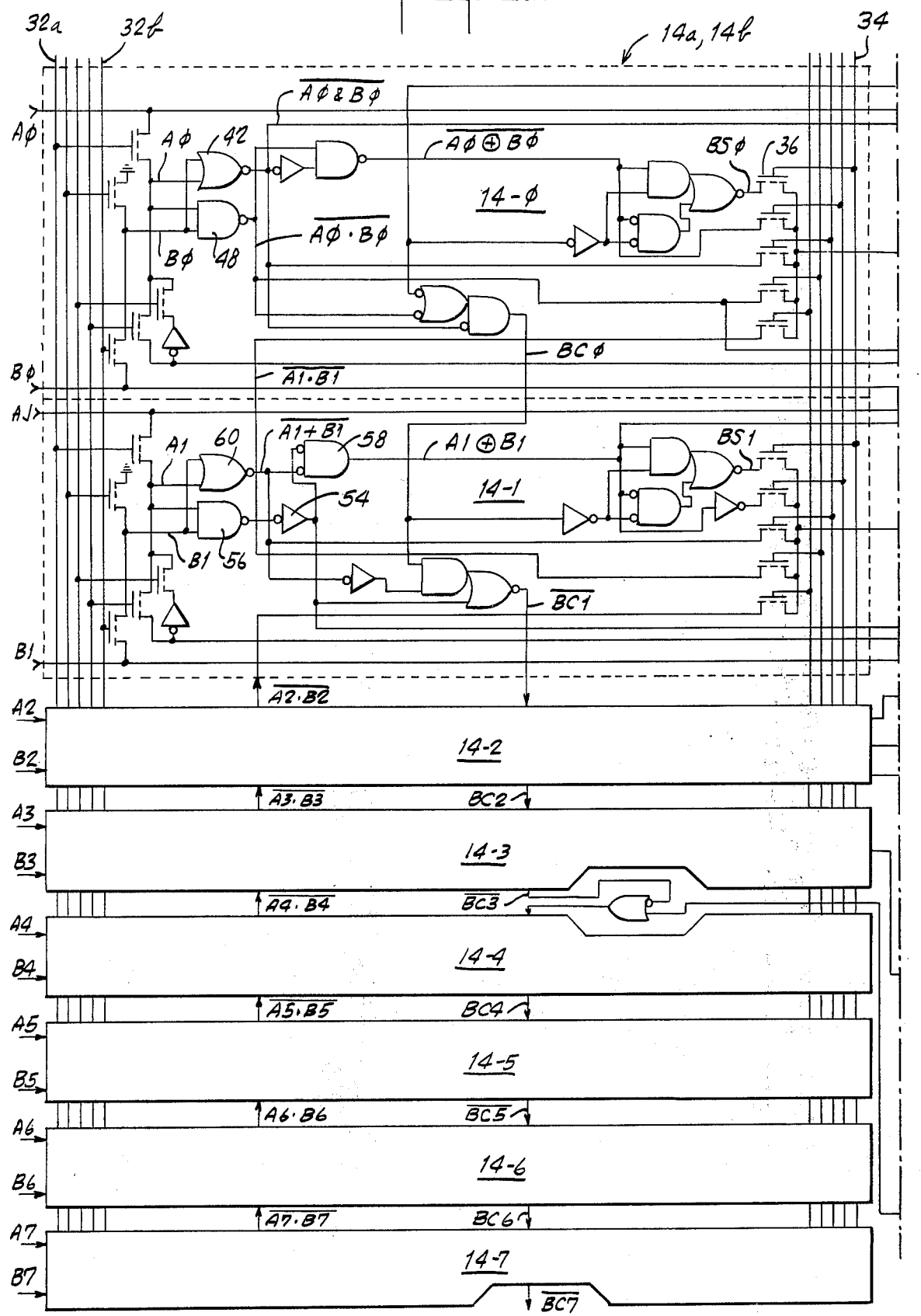

Referring to FIGS. 2a and 2b, which fit together as shown in FIG. 2, the bits of the operands A and B are supplied from the left side of FIG. 2a over the indicated lines labelled accordingly. Only the two lowest order stages 14-0 and 14-1 of the binary adder section 14a are shown in detail at FIG. 2a, it being understood that the stages for bits 2, 4, 6 etc. are identical to the stage 14-0 except for the different input and output lines, and it being understood that the stages for bits 1, 3, 5 etc. are identical to the stage 14-1 except for the different input and output lines. The operands A and B are applied to the binary adder by activating input switch lines 32a and 32b to open the shown switches and apply the respective order bits of the operands A and B to the respective order stages of the binary adder. Referring to the lowest order stage 14-0, the bits A0 and B0 of the operands A and B are applied to the shown gating network and the binary sum bit BS0 is provided at the indicated output line when the output control line 34 is activated to open a switch 36. The lowest order stage 14-0 of the binary adder has a carry input line 38 receiving the inverse of a carry-in bit ACIN that may be provided from a different (not shown) portion of the microprocessor. The stage 14-0 of the adder has a carry output applying the lowest order binary carry bit BC0 to the carry input of the next order stage 14-1. Similarly, the next order stage 14-1 of the binary adder receives the binary bits A1 and B1 of the binary operands A and B when the input switch lines 32a and 32b are activated and provides a binary sum bit BS1 at the indicated output line, as well as a binary carry bit BC1 which is applied to the carry input of the next order stage 14-2 of the binary adder. Since every even-number stage of the binary adder is identical in structure to the zero order stage and every odd-number stage is identical to the 14-1 stage, the remaining stages of the 8-bit parallel adder are only shown as appropriately labelled blocks.

When a decimal operation is to be performed by the network shown in FIGS. 2a and 2b, for example a decimal addition operation, the command signal DAA is present at line 18 in FIG. 2b and the command signal DAAL is present at line 20a. The signal DAA enables the AND-gate 28a to provide to the adder stage 14-4 the decimal carry bit DC3 generated by the illustrated gating network 26a, while the signal DAAL enables the indicated decimal correction gating network 30a to selectively modify the binary sum bits BS0 through BS3 so as to provide the indicated decimal sum bits DS0 to DS3. The decimal carry bit DC3 is provided by a logical gating network that can be described by the following binary logic expression:

$$DC3 = BC2 \cdot (A3 + B3) + A3 \cdot B3 + DAA \{(A2+B2)[A1 \cdot B1 \cdot (ACIN + A\emptyset \cdot B\emptyset)(A\emptyset+B\emptyset)] + [A2 + B2) \cdot \overline{A2 \cdot B2} + A1 \cdot B1 + (A1 \oplus B1) + (ACIN + A\emptyset \cdot B\emptyset)(A\emptyset + B\emptyset)] \cdot [A2 \cdot B2 + (A3 + B3)]\}$$

Specifically, the decimal carry bit DC3 is generated as follows. An OR-gate 42 in the lowest order stage 14-0 of the binary adder provides at its output the signal $\overline{A\emptyset + B\emptyset}$, which is applied to the negation input of an AND-gate 44 at FIG. 2b, while the other input of the AND-gate 44 is the output of an OR-gate 46 having two negative inputs: one receiving the signal $\overline{ACIN}$, which is the negation of a possible carry-in from the addition or subtraction of possible lower order bits, and the other receives the signal $\overline{A\emptyset \cdot B\emptyset}$, which is provided at the output of an AND-gate 48 at the adder stage 14-0 receiving the operand bits A$\emptyset$ and B$\emptyset$. The output of the AND-gate 44, which is the signal $(A\emptyset + B\emptyset) \cdot (ACIN + A\emptyset \cdot B\emptyset)$ is applied to the inputs of an AND-gate 50 and an OR-gate 52. The other input of the AND-gate 50 is the signal A1·B1 provided from the stage 14-1 of the binary adder and specifically from an inverter 54 whose input is the output of an AND-gate 56 receiving the bits A1 and B1 of the binary operands A and B. The OR-gate 52 has three other inputs: (1) the signal A1 ⊕ B1 from the output of an AND-gate 58 receiving as inputs the output of the inverter 54 and the output of an OR-gate 60 whose inputs are the bits A1 and B1 of the operands A and B; (2) the signal A1·B1 from the output of the inverter 54; and (3) the signal (A2 + B2)·(A2·B2) from the output of an AND-gate 62 whose inputs are: a) the signal $\overline{A2 + B2}$ which is derived at stage 14-2 of the adder from a gate similar to gate 42 at stage 14-0; and b) the signal A2·B2 from an inverter 64 whose input is from a gate at stage 14-2 of the adder corresponding to gate 48 at stage 14-0. The signal A2·B2 from the inverter 64 is also applied to one of the inputs of an OR-gate 66 whose other input is the signal A·3 ⊕ B3 from a gate in the adder stage 14-3 corresponding to the gate 58 in stage 14-1. The output of the AND-gate and the signal $\overline{A2 + B2}$ are applied to the negation inputs of an AND-gate 68, while the outputs of the OR-gate 52 and the OR-gate 66 are applied to the negation inputs of an AND-gate 70, and the outputs of the AND-gates 68 and 70 are applied to an OR-gate 72, whose output is the decimal carry signal DC3 discussed earlier. This decimal carry signal DC3 is applied to OR-gate 24a, also discussed earlier, which receives the binary carry BC3 from the 14-3 stage of the binary adder and provides at its output either the binary carry BC3 from the carry output of the adder stage 14-3 or the decimal carry DC3 from the AND-gate 28a, depending on whether a decimal operation command DAA is present or not. The carry from the OR-gate 24a is applied to the carry input of the adder stage 14-4.

The gating nework 26b for deriving the decimal carry from the stage 14-7 of the binary adder is not expressly shown, but is similar to the network 26a. The network 26b provides the decimal carry DC7 by logical gating similar to that of the gating 26a and represented by the following binary logic expression:

$$DC7 = BC7 + DAA \{ (A6 + B6)\cdot(A5\cdot B5\cdot BC4) + \\ [(A7 + B7) + (A6\cdot B6)]\cdot[A6 + B6) + (A5\cdot B5) + \\ (A5 + B5) + BC4] \}$$

Referring to FIG. 2b, the binary sum bits BS$\emptyset$ to BS3 from the binary adder stages 14-0 to 14-3 are supplied to the decimal correction gating network 30a for modification in accordance with the invention to provide the low 4 bits of the binary coded decimal sum or difference of the operands A and B. For providing the binary coded decimal sum of operands A and B; the sum bit BS$\emptyset$ is transmitted to the output line DS$\emptyset$ unchanged; the binary sum bit BS1 is always inverted in the course of its passage through the gating network 30a; the binary sum bit BS2 is inverted only if it is a logical zero; and the binary sum bit BS3 is inverted only if either the binary sum bit BS1 or the binary sum bit BS2 is a logical one. If the output lines DS$\emptyset$ to DS3 are to represent the binary coded decimal difference of the operands A and B; bit BS$\emptyset$ is again left unchanged; bit BS1 is always inverted only if either the negation of bit BS1 or the negation of bit BS2 is a logical one. More specifically, the logical level of the decimal output bits DS$\emptyset$ to DS3 can be represented as follows, where the command DAAL is present when a decimal addition operation is performed and the command DSAL is present when a decimal subtraction operation is performed:

$$DS\emptyset = BS\emptyset$$
$$DS1 = (DSAL + DAAL) \oplus BS1$$
$$DS2 = (DSAL\cdot BS1 + DAAL\cdot \overline{BS1}) \oplus BS2$$
$$DS3 = [(BS1 + BS2)\cdot DAAL + \overline{(BS1 + BS2)}\cdot DSAL] \oplus BS3$$

Referring to FIG. 2b the binary sum bit BS0 is supplied to the output line DS$\emptyset$ unchanged through switches 74 and 76, while the binary sum bits BS1, BS2 and BS3 are applied through switches 78, 80 and 82 respectively to the indicated gating networks forming a part of the network 30a. Referring to stage 30a-1 of the network 30a, the commands DAAL and DSAL are supplied over the indicated lines to an OR-gate 84, and the output of the gate 84 is supplied to OR-gates 86 and 88 which also receive the binary sum bit BS1 and provide their outputs to an AND-gate 90, whose output is the decimal bit DS1 and is supplied to the DS1 output line through a switch 92. Referring to stage 30a-2 of the gating network 30a, an AND-gate 94 combines the binary sum bit BS1 and the decimal add command DAAL, while an AND-gate 96 combines the binary sum bit BS1 with the decimal subtract command DSAL. The outputs of the AND-gates 94 and 96 are combined by an OR-gate 98 whose output is applied to each of OR-gates 100 and 102, each of which also receives the binary sum bit BS2 through the switch 80. The outputs of the OR-gates 100 and 102 are applied to an AND-gate 106, whose output is the decimal output bit DS2, applied through a switch 108 to the output line labeled DS2. Referring to stage 30a-3 of the gating network 30a, the binary sum bits BS1 and BS2 are combined at OR-gates 110 and 112, whose outputs are combined at AND-gates 114 and 116 with the decimal add and decimal subtract commands DAAL and DSAL. The outputs of the AND-gates 114 and 116 are combined at an OR-gate 118, whose output is combined at OR-gates 120 and 122 with the binary sum bit BS3 provided through switches 82 and 83. The outputs of the OR-gates 120 and 122 are combined at an AND-gate 124 to provide the decimal result bit DS3, which is applied to the output line labelled DS3 through a switch 126.

The decimal correction gating network 30b is implemented in the same manner as the network 30a described immediately above, except for the differently labelled inputs and outputs. Specifically, the logical function of the gating network 30b can be represented by the following binary logic expressions, where the binary sum bits from the high 4-bits of the binary adder are BS4 to BS7, the decimal result bits are DS4 to DS7, and the decimal add command is DAAH while the decimal subtract command is DSAH:

$$DS4 = BS4$$
$$DS5 = (DSAH + DAAH) \oplus BS5$$
$$DS6 = (DSAH\cdot BS5 + DAAH\cdot \overline{BS5}) \oplus BS5$$
$$DS7 = [(BS5 + BS6)\cdot DAAH + \overline{(BS5 + BS6)}\cdot DSAH] \oplus BS7$$

It should be clear that the terms OR-gate and AND-gate are used in this specification to refer to all types of such gates, including gates which have negative inputs or outputs. The specific gates used are indicated by appropriate symbols in the drawings. It should also be clear that certain switches and inverters shown in the drawings have not been discussed in the specification since their function is clear from the context. Additionally, it should be clear that while the invention is most beneficial for use in microprocessors, where both a minimum number of components and a maximum operating speed are important factors, it is also useful in other similar machines, such as minicomputers and calculators.

We claim:

1. An integrated circuit microprocessor comprising:
   means for providing a pair of 8-bit operands;
   a parallel binary adder having 8 stages receiving the corresponding order operand bits and corresponding order carry-in bits and providing corresponding order straight binary sum bits and corresponding order straight binary carry-out bits;
   means for selectively providing a decimal operation command signal;
   first gating means responsive to said command signal for selectively modifying the 4th and 8th order binary carry-out bits concurrently with the binary addition of the operands by the adder to provide a 4th and an 8th order decimal carry-out bits and for applying the OR-function of the 4th order binary and decimal carry-out bits to the 5th adder stage as a carry-in bit; and
   second gating means responsive to said command signal for modifying said binary sum bits to provide an 8-bit result corresponding selectively to the binary coded decimal sum or difference of the operands.

2. An integrated circuit microprocessor comprising:
   means for providing two 4-bit operands;
   a parallel, 4-bit, straight binary adder receiving the operands and providing the binary sum thereof and a 4th order straight binary carry-out bit;
   means for selectively providing a decimal operation command signal;
   first gating means connected to the binary adder and responsive to said command signal for modifying said 4th order binary carry-out bit to provide a 4th order decimal carry-out bit concurrently with the addition of the operands by the binary adder; and second gating means connected to the adder to receive the binary sum of the operands and responsive to said command signal for modifying selected bits of said binary sum to selectively provide the binary coded decimal sum or difference of said operands.

3. A device comprising:

binary adding means having N (N= 2, 3 ... ) successive order sections each having 4 successive order stages each receiving the corresponding order bits of a pair of binary coded decimal operands and a corresponding order carry-in bit and provided to the corresponding order straight binary sum bit and a corresponding order straight binary carry-out bit applied to the next higher order stage as a carry-in bit;

N-1 first gating means each associated with the corresponding order section of the adding means and each including means for providing a decimal carry-out bit corresponding to the carry-out bit of a binary coded decimal sum of the operand bits applied to the associated order section of the adding means;

means for applying a carry-in bit to each lowest order stage of each section of the adding means the OR-function of the binary carry-out bit from the next lower order section and the same order decimal carry-out bit;

N second gating means each associated with a corresponding order section of the adding means but removed therefrom and each selectively modifying the binary sum bits therefrom to provide binary coded decimal sum or difference bits of corresponding order.

4. A device as in claim 3 wherein each first gating means includes means receiving the corresponding order operand bits and providing said decimal carry-out bit only when the binary sum thereof corresponds to at least the decimal number 9.

5. A device comprising:

means for combining a pair of operands, each comprising a plurality of successive order bits representing a number in a selected first binary code, in accordance with an arithmetic operation in a second binary code, different from the first, to provide a plurality of corresponding order result bits representing the result number which would have been obtained if the operands had been in said second code, said combining means including means for providing a selected order carry-out bit for said operation in said second code;

first gating means for combining the operands to provide a selected order carry-out bit corresponding to the carry-out bit which would have resulted from a corresponding operation in said first code on said operands; and second gating means for combining said second code result bits to provide corresponding order first code result bits representing in said first binary code the number which would have resulted from carrying out in the first code said arithmetic opeation.

6. A device as in claim 5 wherein the means for combining the operands to provide the second code result bits comprises a 4-bit binary adder adding operands which are in binary coded decimal form, and the second gating means comprises means for providing said result bits in binary coded decimal form.

7. A device as in claim 5 wherein the means for combining the operands to provide the second code result bits comprises means for adding binary coded operands to provide the sum which would have resulted had the operands been in straight binary code.

8. A device as in claim 7 wherein the first gating means comprises means for providing an N-th order (N=4, 8, 12, ... ) carry-out bit corresponding to the OR-function of the N-th order straight binary carry-out bit and the N-th order binary coded decimal carry-out bit of the sum of the operands.

* * * * *

UNITED STATES PATENT AND TRADEMARK OFFICE
CERTIFICATE OF CORRECTION

PATENT NO. : 3,991,307

DATED : November 9, 1976

INVENTOR(S) : Charles Ingerham Peddle et al

Page 1 of 2

It is certified that error appears in the above-identified patent and that said Letters Patent are hereby corrected as shown below:

Column 1, line 63, delete "microprocessors", and insert -- microprocessor --.

Column 2, line 40, delete "A0", and insert -- AØ --.

Column 2, line 42, delete "B0", and insert -- BØ --.

Column 3, line 4, delete "BS0", and insert -- BSØ --.

Column 3, line 20, delete "BS0", and insert -- BSØ --.

Column 3, line 22, delete "DS0", and insert -- DSØ --.

Column 3, line 24, delete "rod", and insert -- bcd --.

Column 3, line 29, delete "14-0", and insert -- 14-Ø --.

Column 3, line 32, delete "14-0", and insert -- 14-Ø --.

Column 3, line 40, delete "14-0", and insert -- 14-Ø --.

Column 3, line 40, delete "A0", and insert -- AØ --.

Column 3, line 40, delete "B0", and insert -- BØ --.

Column 3, line 42, delete "BS0", and insert -- BSØ --.

Column 3, line 45, delete "14-0", and insert -- 14-Ø --.

Column 3, line 48, delete "14-0", and insert -- 14-Ø --.

Column 3, line 49, delete "BC0", and insert -- BCØ --.

Column 4, line 4, delete "BS0", and insert -- BSØ --.

UNITED STATES PATENT AND TRADEMARK OFFICE
CERTIFICATE OF CORRECTION

PATENT NO. : 3,991,307

DATED : November 9, 1976

INVENTOR(S) : Charles Ingerham Peddle et al

It is certified that error appears in the above-identified patent and that said Letters Patent are hereby corrected as shown below:

Column 4, line 5, delete "DS0", and insert -- DSØ --.

Column 4, line 16, delete "14-0", and insert -- 14-Ø --.

Column 4, line 25, delete "14-0", and insert -- 14-Ø --.

Column 4, line 43, delete "14-0", and insert -- 14-Ø --.

Column 4, line 45, delete "14-0", and insert -- 14-Ø --.

Column 4, line 48, delete "A-3", and insert -- A3 --.

Column 5, line 8, delete "14-0", and insert -- 14-Ø --.

Column 5, line 13, delete ";", and insert -- : --.

Column 5, line 22, delete ";", and insert -- : --.

Column 5, line 36, delete "BS0", and insert -- BSØ --.

Column 5, line 60, delete "labeled", and insert --labelled --.

Column 7, line 12, delete "provided", and insert -- providing --.

Signed and Sealed this

Twenty-second Day of March 1977

[SEAL]

Attest:

RUTH C. MASON
*Attesting Officer*

C. MARSHALL DANN
*Commissioner of Patents and Trademarks*